July 2, 1957  R. S. ANDERSON  2,797,518
FISH LURE
Filed Aug. 9, 1955
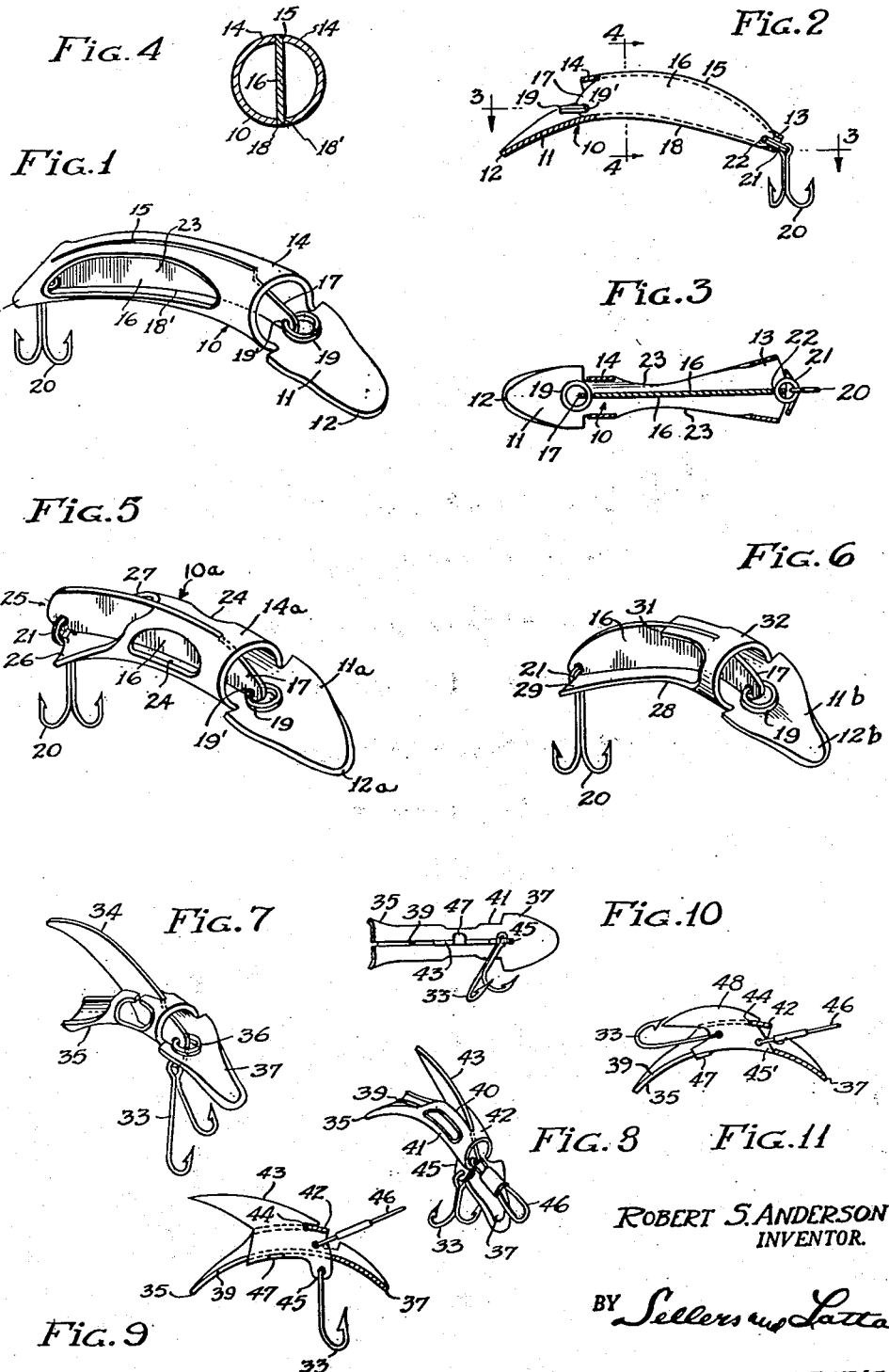
ROBERT S. ANDERSON
INVENTOR.
BY Sellers and Latta
—ATTORNEYS—

United States Patent Office 2,797,518
Patented July 2, 1957

2,797,518
FISH LURE
Robert S. Anderson, Van Nuys, Calif.
Application August 9, 1955, Serial No. 527,235
11 Claims. (Cl. 43—42.06)

This invention relates to fishing tackle and especially to light tackle used in casting for smaller game fish, and more particularly to a lure having a definite underwater swimming action and structurally integrated flashing means.

In the development of the lure as an angler's accessory, the attention of most experimenters has heretofore been directed to the appearance of the device, and in lures such as the plunker, the minnow and bucktail no significant attempt has been made to incorporate movement into the bait other than that imparted by drawing it directly through the water with the line. In lures customarily referred to as wigglers, spinners and spoons the contour of the longitudinal planes of the devices have been modified in various manners calculated to cause the bait to deviate in some manner from a direct line of movement through the water, and each moves in a way broadly suggested by its name. The spinner rotates about the axis of the line, the wiggler jerks from side to side and the spoon girates haphazardly in a manner so unpredictable that it often dodges away from a fish attempting to take it.

Furthermore, all of the lures presently available that do move radially relative to their generally axial and longitudinal direction of principal movement do not continue for any considerable distance on a divergent path since in so doing they expose broad areas of their planar surfaces to the pressure of the water through which they are being drawn and are quickly swung to a generally opposite diagonal direction of movement. As a consequence, none of them deviate very far from the most direct path of travel and their motion in the water would be best described as a wiggling motion while travelling in a single general direction.

In addition, since they are directionally unstable and unable to hold a self-selected path of travel for any great distance, they not infrequently follow the path of least resistance and work their way toward the surface more rapidly than an inert and weighted lure not adapted for movement in the water. While this behavior is normal in lures used in fly casting, it is a highly undesirable characteristic in lures used to attract fish that rarely come to the surface of the water or are found in greatest abundance considerably beneath the surface.

With the foregoing in mind it is believed that my various important objects in this invention will be readily understood and appreciated.

One important object of my invention is the provision of a lure having definite and pronounced swimming action.

Another important object of my invention is the provision of a fishing lure adapted for swimming under water, as contrasted with the surface moving or floating types.

A further object of my invention is the provision of a fish lure that combines the general characteristics of the plug type and the flasher types of lures.

And a still further object of my invention is the provision of a fishing lure composed of two main parts, having their contoured surfaces arranged to display horizontal and vertical contours, and which cooperate to produce various patterns of movement which can be varied by the use of different combinations or interchangeable horizontal and vertical vanes.

A further object of my invention is to provide a fish lure in which vanes can be detached and different colors and shapes substituted.

In brief, the lure of my invention includes a longitudinally extended arcuate main body portion disposed generally in a horizontal plane but having a generally tubular central portion adapted with slots to interfit with a vertically disposed fin-like vane having a perforation in its forward end through which the line is attached. The concave side of the arcuate horizontal portion is disposed downwardly and induces a bobbing movement of the lure when moving forwardly through the water, and the inner and outer surfaces of the cylindrical central portion present areas of resistance to the water pressure which cause the lure to veer widely off to one side of the direction in which it is drawn through the water then swing abruptly to the opposite side of the main direction of travel. In this manner, the combination of the bobbing motion and the broad movement from side to side of the center of forward force give the lure the appearance of actually swimming through the water in a broadly sweeping laterally undulating movement. Different combinations of vertical and horizontal members provide varying behaviour characteristics which, in turn, have proved more or less advantageous in attracting different kinds of fish.

Other objects and distinguishing features of my invention will become apparent upon reading the following description of one preferred embodiment and certain modifications thereof when read with reference to the accompanying drawings in which:

Fig. 1 is a perspective view of a lure embodying my invention;
Fig. 2 is a vertical longitudinal sectional view thereof;
Fig. 3 is a horizontal longitudinal sectional view thereof taken on line 3—3 of Fig. 2;
Fig. 4 is a transverse sectional view of the same taken on line 4—4 of Fig. 2;
Fig. 5 is a perspective view of a modified form;
Fig. 6 is a perspective view of another modified form;
Fig. 7 is a perspective view of still another variation of the invention;
Fig. 8 is a perspective view of another modified form of the invention;
Fig. 9 is a vertical longitudinal sectional view thereof;
Fig. 10 is an inverted plan view of the same; and
Fig. 11 is a vertical longitudinal sectional view of another modified form of the invention.

Referring now to the drawings in detail and in particular to Figs. 1–4 inclusive, I have shown therein, as an example of one form in which my invention may be embodied, a lure comprising generally a body section 10 and a vertical vane 16. Body section 10 includes a tubular portion 14 and a flattened lip 11 integral with and projecting forwardly from the forward basal portion thereof and terminating in a tapered forward tip 12. Body section 10 has a flattened rear end 13. It is arched upwardly from front to rear as shown. It is provided in its upper surface with a medially disposed slot 15 which receives the upper edge portion of vane 16 throughout the majority of the length of the vane 16, the forward end portion 17 of the vane being reduced in height and projecting forwardly through the tubular portion 14. Body section 10 has in its basal portion a slot 18' (Fig. 1) in which is received the lower margin 18 (Fig. 2) of the vane 16. As indicated in Fig. 2, the slots 15 and 18' terminate just short of the forward end of tubular portion 14 and the rear end of the body section 10. The respective sides of body section 10 are cut away to provide elongated openings 23 extending longitudinally of the body section 10, through which openings the vane 16 is visible.

A ring 19 is entered in the forward end 17 of the vertical fin 16 through a hole 19' and provides convenient means for attaching the lure to the fishing line.

The fish hook 20 is attached to the fin member 16 by a second ring 21 secured in a hole 22 adjacent the rearward end 13 of the main body section 10.

As will be seen by collective inspection of Figs. 1, 2 and 3, the body section 10 is actually a tube which is cut away above the lip 11 and at the respective sides, and which is substantially circular at the section 14. Behavior of the lure is dependent upon a delicate balance in resistance and counter-resistance of the areas to the force of the water through which they pass, and it is for this reason that different patterns of underwater behavior can readily be obtained by variations in the body and vane elements used in the combination.

In Fig. 5 the embodiment is similar to that of Fig. 1 except that the body section 10a, including tubular portion 14a and the lateral openings 24 in Fig. 5 are shortened and the sidewalls of the tubular body are bent down at the rearward end 25 to provide wings 26 and 27 thus giving the lure less lateral stability and greater horizontal stability when moving forwardly through the water. The forward tip 12a of lip member 11a is more pointed than the corresponding part in Fig. 1.

In Fig. 6 the tubular sidewall is even further reduced at 31 leaving only a narrow collar 32 of the tubular conformation of the preceding types. Also the basal portion 28 of the main body section is generally flat at the rearward ends 29 the forward tip 12b of the lip 11b may be somewhat more slender than the corresponding part in Fig. 5.

The fish hooks 20, 20 in the leader connections 17, 19 of Figs. 5 and 6 are the same as in Fig. 1 and the same reference numerals are therefor applied to these parts.

In Fig. 7 the fish hooks 33 are attached to the central fin member 34 which is pitched at an acute angle relative to the horizontal basal section 35. The fin member is also considerably enlarged in this type.

The obvious structural differences in the lures of Figs. 1 and 7 make the relationship of conformation to underwater behavior readily understandable. As the lure in Fig. 7 is drawn forwardly by a line attached to the ring 36, the forwardly projecting lip 37 moves downwardly into the relatively solid mass of the water causing the lure to turn downwardly or diagonally with respect to the principal direction of movement. As the lure turns, the fin 34 becomes opposed to the pressure of the water forcing the vane backwardly and changing the direction in which the guiding lip is disposed. This change in the angle of the lip relative to the direction of force diverts the lure from its first lateral path of movement to a diagonally opposite course. This might be considered the basic pattern of movement, but the rapidity with which the lure changes its direction and its relative tendency to move in planes perpendicular to or parallel with the surface of the water depend entirely upon the considerations set forth above and the contour and conformation of the body and fin elements used in combination.

The lure shown in Fig. 1 follows generally the same pattern of movement as the lure of Fig. 7, but the former moves a much greater distance in each diagonal direction before its smaller vertical vane 16 causes it to roll over and thereby change direction.

The distinguishing features of the flasher type of lure are readily embodied in any lures constructed according to my invention by using a vertical fin member having a brightly colored or highly reflective surface.

Referring now to Figs. 8, 9 and 10 showing a preferred form of the invention, the basal portion of the body has a slot 39, in its medial vertical longitudinal plane, extending continuously from the tip of its tail to the base of lip 37, and at its top has a slot 40, in the same plane, extending from the rear end of the tubular body 41, terminating just short of the forward end of body to provide a bridge 42. Vertical fin 43 has a forward notch 44 to receive bridge 42, a downwardly and forwardly projecting tab 45 with an aperture to provide an anchorage for hook gang 33, another aperture at an elevation between tongue 37 and bridge 44, to which leader eye 46 is attached, and a tab 47 projecting laterally from its lower edge and engaging beanth the basal portion of body 41, to lock the fin against upward movement when pulled forwardly by leader eye 46.

In this form of the invention fin 43, hook gang 33 and leader eye 46 constitute a unit that can readily be slipped out of the rear end of tubular body 41, eye 46 passing longitudinally through tubular body 41, while tab 45 slides in slot 39. A number of these fin-hook-eye units may be provided, with different colorings and slightly different marginal configurations, thus to give the angler a choice of a number of "fly" designs, using only one of the tubular bodies 41. An optional fin-hook-eye unit is shown in Fig. 11, the hook gang being attached to the rear end of the vane body 48 instead of the front end as in Fig. 9, and tab 45 being correspondingly eliminated, and a lower forward corner 45' having locating engagement against the front end of slot 39. The body parts in Fig. 11 are the same as in Fig. 7–10 and the same numerals are therefor applied thereto.

I claim:

1. In a fishing lure: a generally tubular body section having an integral flattened lip member projecting forwardly from the forward basal portion thereof and having a pair of opposed slots in said basal portion thereof and in the top thereof, disposed in the medial vertical longitudinal plane thereof; and a flat vane disposed in said plane with its upper and lower marginal portions received and retained in said slots and its forward end abutted against an edge of said body defining a forward extremity of one of said slots, said vane having at said forward end means for attachment of a leader and having, rearwardly thereof, means for attachment of a hook; said body having lateral portions thereof cut away to expose respective sides of the vane.

2. In a fishing lure: a generally tubular body section having an integral flattened lip member projecting forwardly from the forward basal portion thereof and having a pair of opposed slots in said basal portion thereof and in the top thereof, disposed in the medial vertical longitudinal plane thereof; and a flat vane disposed in said plane with its upper and lower marginal portions received and retained in said slots and its forward end abutted against an edge of said body defining a forward extremity of one of said slots, said vane having at said forward end means for attachment of a leader and having, rearwardly thereof, means for attachment of a hook; said body having lateral portions thereof cut away to expose respective sides of said vane, said body being arched upwardly intermediate its ends and said lip being inclined downwardly and forwardly of said leader-attachment means to impart to said lure, when drawn forwardly in the water by a pull applied thereto at said leader attachment means, a broadly sweeping laterally undulating movement.

3. A lure as defined in claim 2, wherein said body has web portions defining closed forward ends for both said slots, and wherein said forward end of the vane engages both said web portions.

4. A lure as defined in claim 2, wherein said vane is encompassed wholly within the contour of said body as projected on said medial plane, wherein the forward end of said body is open, and wherein the rear end of said body is substantially closed.

5. A lure as defined in claim 2, wherein said body is open at both forward and rear ends, said vane projects rearwardly beyond the opening of said rear end, and said body has openings in its respective sides, providing said cutaway exposure.

6. A lure as defined in claim 2, wherein the rear ends of said slots are open to provide for insertion and removal of said vane.

7. A lure as defined in claim 2, wherein said body includes a ring portion of relatively short axial extent joining its said basal and top portions, wherein said basal and top portions project rearwardly from said ring portion, and wherein rearwardly opening spaces are defined between said basal and top portions rearwardly of said ring portion, at respective sides of the body to provide said cutaway exposure.

8. A lure as defined in claim 2, wherein said vane has a forwardly opening notch, and said body has an arched web portion defining the forward extremity of its upper slot and received in said notch.

9. A lure as defined in claim 2, wherein said vane has a forwardly opening notch, and said body has an arched web portion defining the forward extremity of its upper slot and received in said notch; and wherein said vane has a fin projecting diagonally upwardly and rearwardly through said upper slot and above said body and a tab projecting downwardly through said lower slot and having said hook-attachment means therein.

10. A lure as defined in claim 2, wherein said vane has a forwardly opening notch, and said body has an arched web portion defining the forward extremity of its upper slot and received in said notch; wherein said vane has a fin disposed above said body and projecting rearwardly; and wherein said hook-attachment means is disposed within said body.

11. In a fishing lure: a tubular body portion arched upwardly intermediate its ends and having an integral flattened lip projecting forwardly from its forward basal portion and inclined downwardly, said body portion having a pair of opposed slots in the forward basal portion thereof and having a pair of opposed slots in a vertical longitudinal plane thereof; and a flat vane disposed in said plane with its upper and lowermarginal portions received and retained in said slots and its forward end abutted against web portions of said body defining forward extremities of said slots, said vane having at said forward end means for attachment of a leader and having near its rear end means for attachment of a hook; said body having in its respective sides, openings exposing respective sides of said vane; said lip imparting to said lure, when drawn forwardly in the water by a pull applied thereto at said leader attachment means, a broadly sweeping laterally undulating movement, the pull applied to said vane being transmitted to said body through the said abutting engagement of the forward ends of the vane against said body webs.

References Cited in the file of this patent

UNITED STATES PATENTS

| | | |
|---|---|---|
| 2,569,465 | Farr | Oct. 2, 1951 |
| 2,588,300 | Smith | Mar. 4, 1952 |
| 2,674,059 | Hayden | Apr. 6, 1954 |